(No Model.) 10 Sheets—Sheet 1.

J. E. MATZELIGER, Dec'd.
G. W. MOULTON, EXECUTOR.
LASTING MACHINE.

No. 459,899. Patented Sept. 22, 1891.

WITNESSES:
Chas. S. Gooding.
M. E. Whitcomb

INVENTOR:
J. E. Matzeliger,
by C. B. Tuttle
Atty.

THE NORRIS PETERS CO., PHOTO-LITHO., WASHINGTON, D. C.

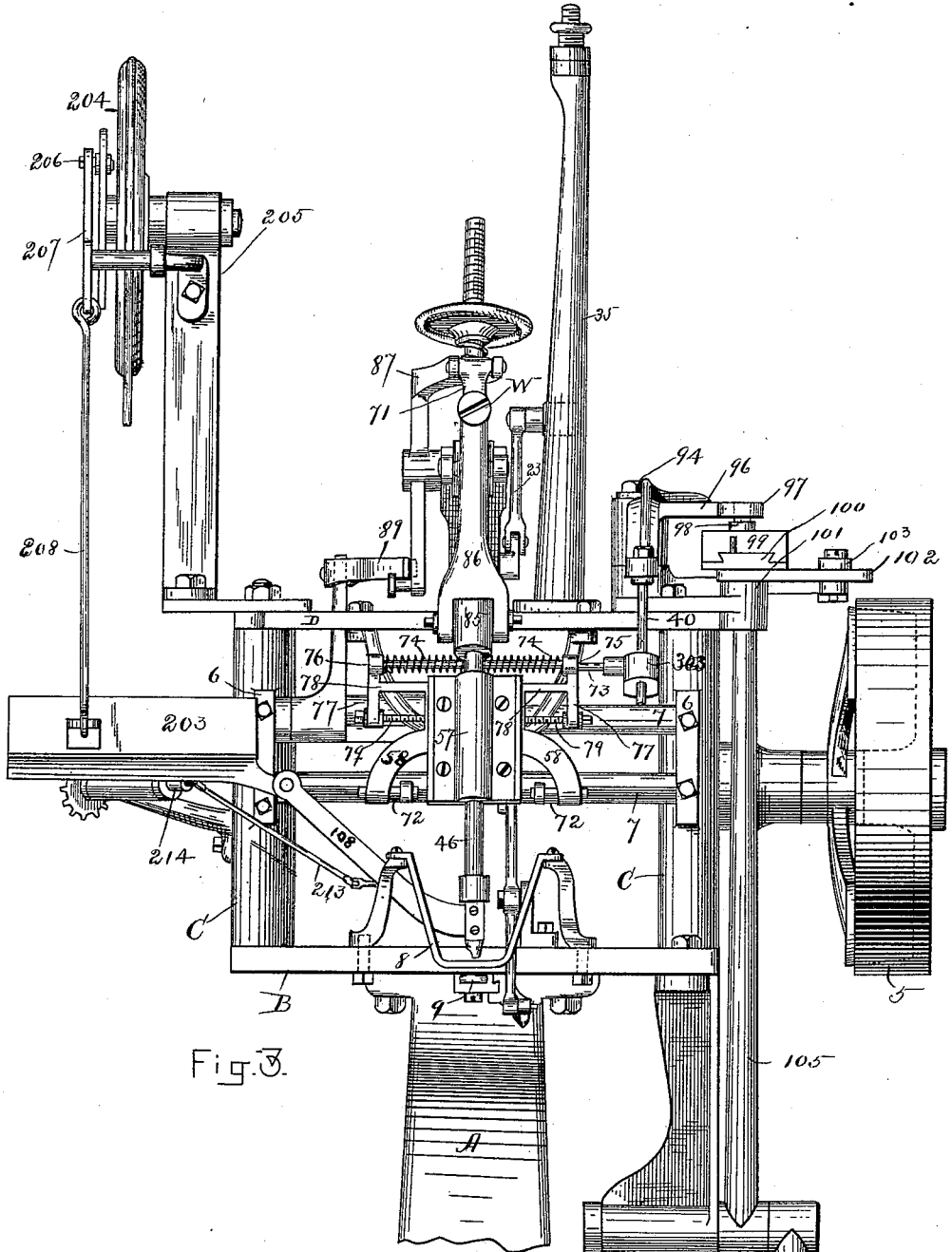

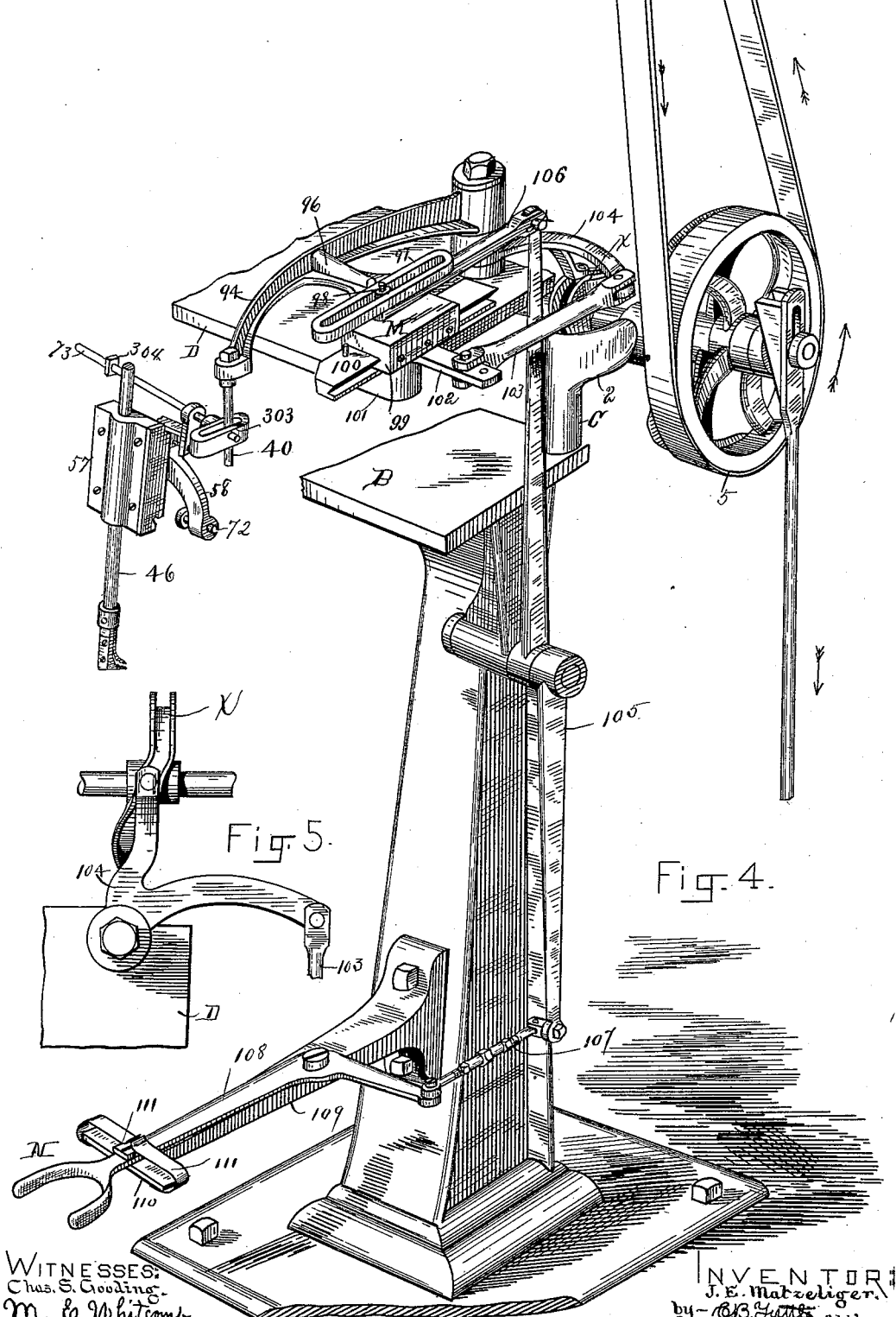

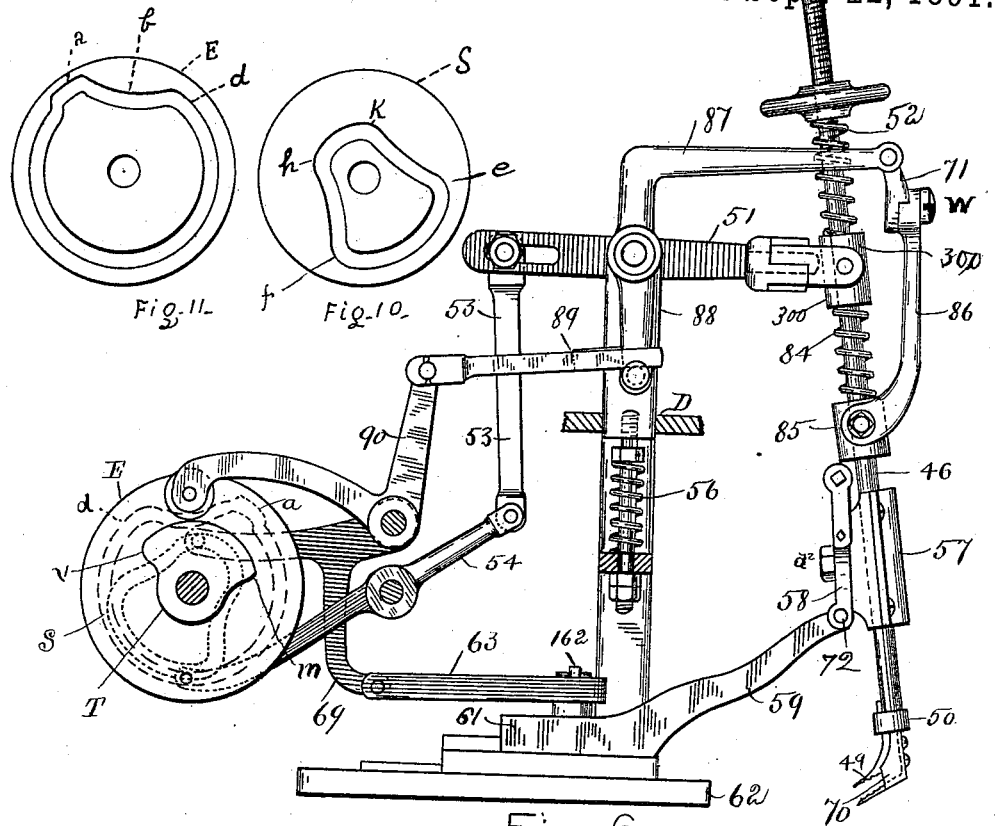
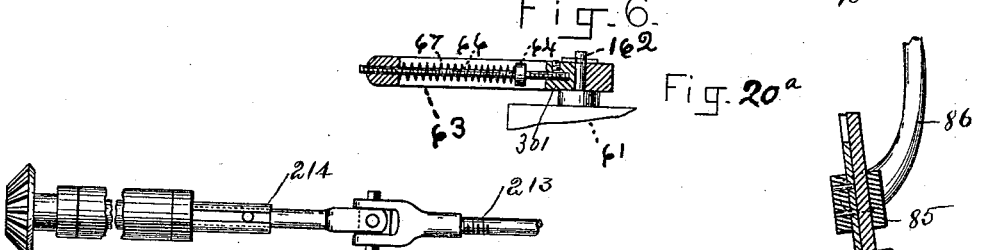
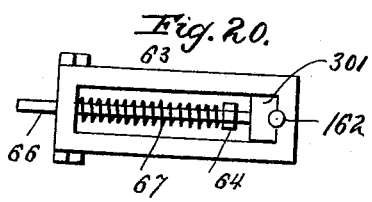
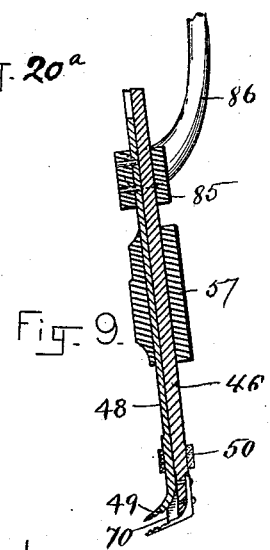

(No Model.) 10 Sheets—Sheet 6.

J. E. MATZELIGER, Dec'd.
G. W. MOULTON, Executor.
LASTING MACHINE.

No. 459,899. Patented Sept. 22, 1891.

WITNESSES:
Chas. S. Gooding
M. E. Whitcomb

INVENTOR:
J. E. Matzeliger.
by: C. B. Tuttle
Att'y.

(No Model.) J. E. MATZELIGER, Dec'd. 10 Sheets—Sheet 7.
G. W. MOULTON, EXECUTOR.
LASTING MACHINE.

No. 459,899. Patented Sept. 22, 1891.

WITNESSES:
Chas. S. Gooding.
M. E. Whitcomb

INVENTOR:
J. E. Matzeliger
by: C. B. Tuttle
Att'y.

(No Model.) 10 Sheets—Sheet 8.
J. E. MATZELIGER, Dec'd.
G. W. MOULTON, Executor.
LASTING MACHINE.
No. 459,899. Patented Sept. 22, 1891.
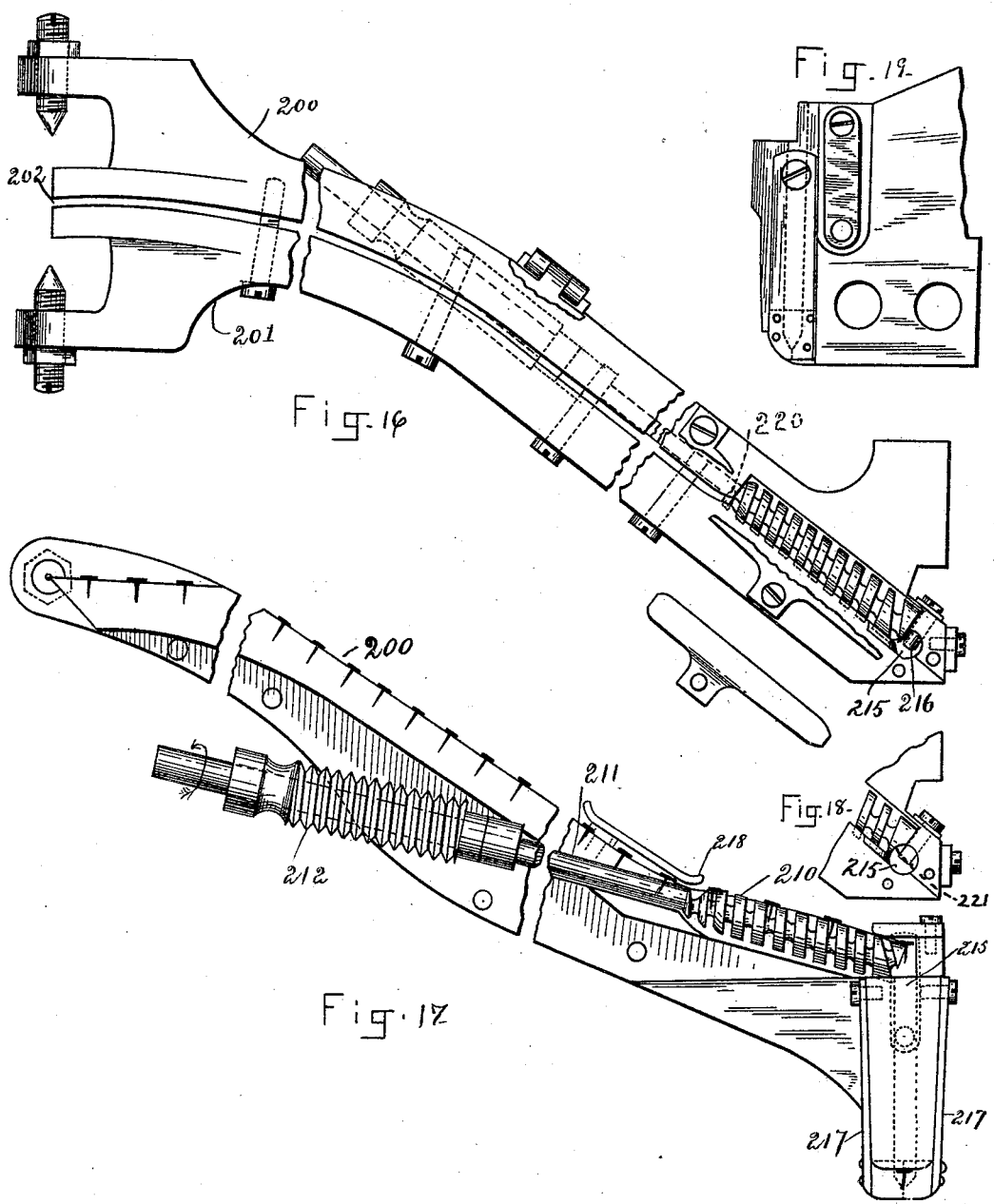
WITNESSES:
Chas. S. Gooding
M. E. Whitcomb
INVENTOR:
J. E. Matzeliger.
by C. B. Tuttle
Atty.

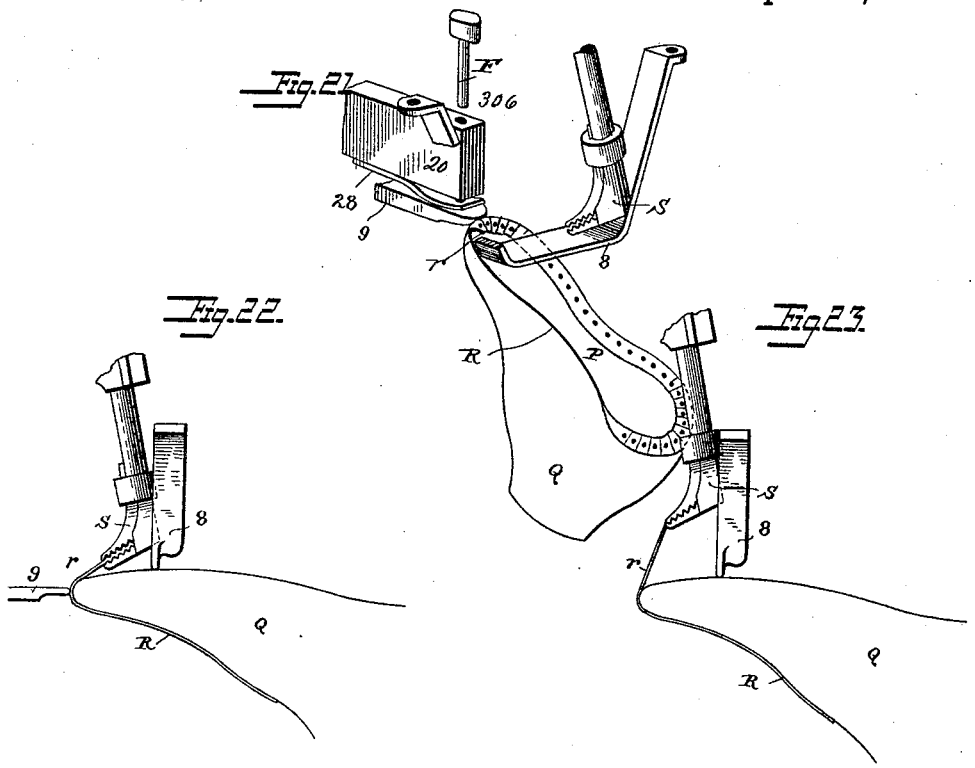

(No Model.)  10 Sheets—Sheet 10.
J. E. MATZELIGER, Dec'd.
G. W. MOULTON, Executor.
LASTING MACHINE.
No. 459,899. Patented Sept. 22, 1891.
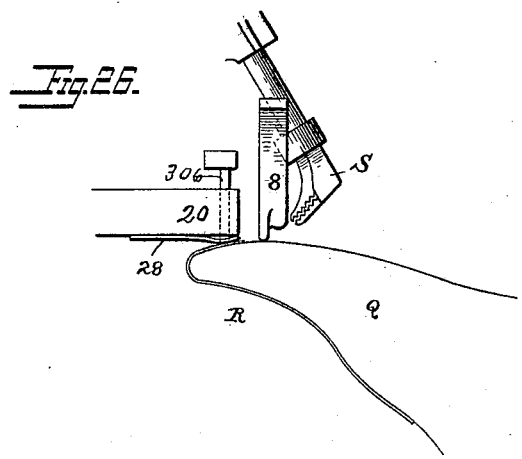
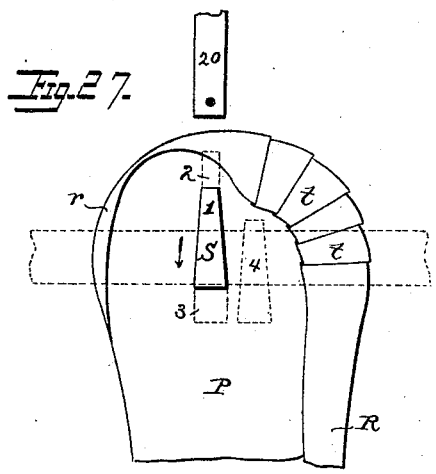
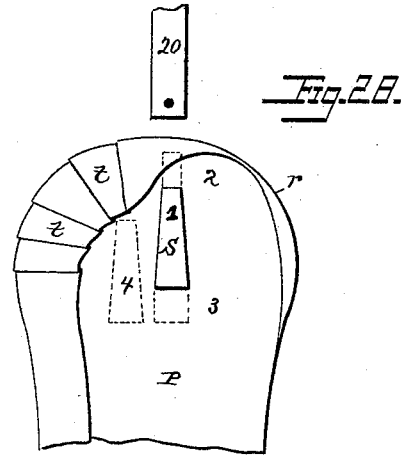
Attest:
Sidney L. Johnson
N. G. Campbell
Inventor:
J. E. Matzeliger
By Foster & Freeman
Attys.

UNITED STATES PATENT OFFICE.

JAN E. MATZELIGER, OF LYNN, MASSACHUSETTS, ASSIGNOR, BY MESNE ASSIGNMENTS, TO THE CONSOLIDATED HAND METHOD LASTING MACHINE COMPANY, OF NASHUA, NEW HAMPSHIRE; GEORGE W. MOULTON EXECUTOR OF JAN E. MATZELIGER, DECEASED.

LASTING-MACHINE.

SPECIFICATION forming part of Letters Patent No. 459,899, dated September 22, 1891.

Application filed August 14, 1885. Serial No. 174,378. (No model.)

*To all whom it may concern:*

Be it known that I, JAN EARNST MATZELIGER, of Lynn, in the county of Essex and Commonwealth of Massachusetts, have invented certain Improvements in Lasting Shoes, of which the following, taken in connection with the accompanying drawings, is a specification.

This invention relates to lasting shoes and mechanism therefor, and as an aid to more fully understanding certain details of the mechanism employed reference will be made to Letters Patent of the United States, No. 274,207, which have been previously granted to me.

Figure 1:
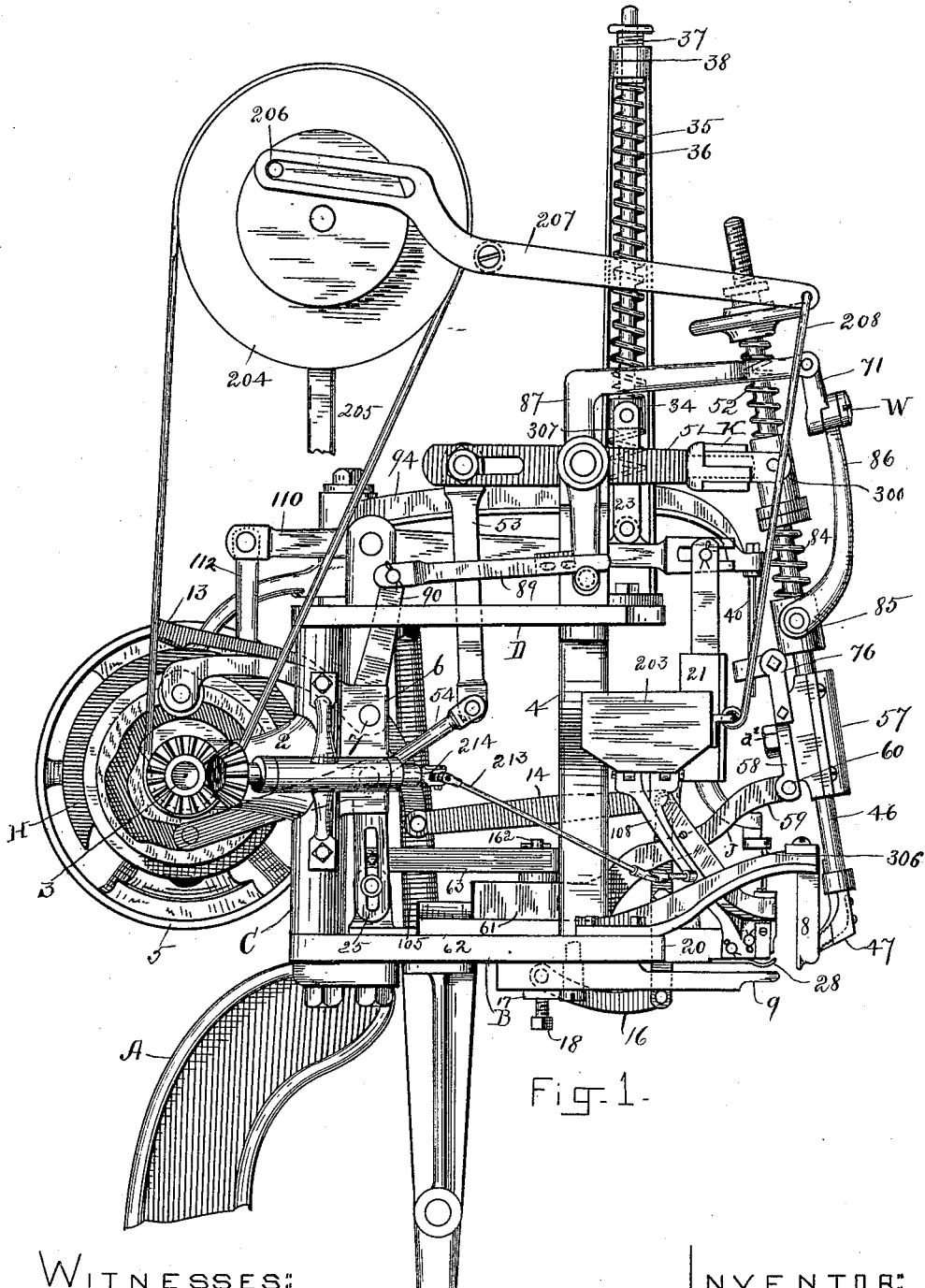
Figure 2:
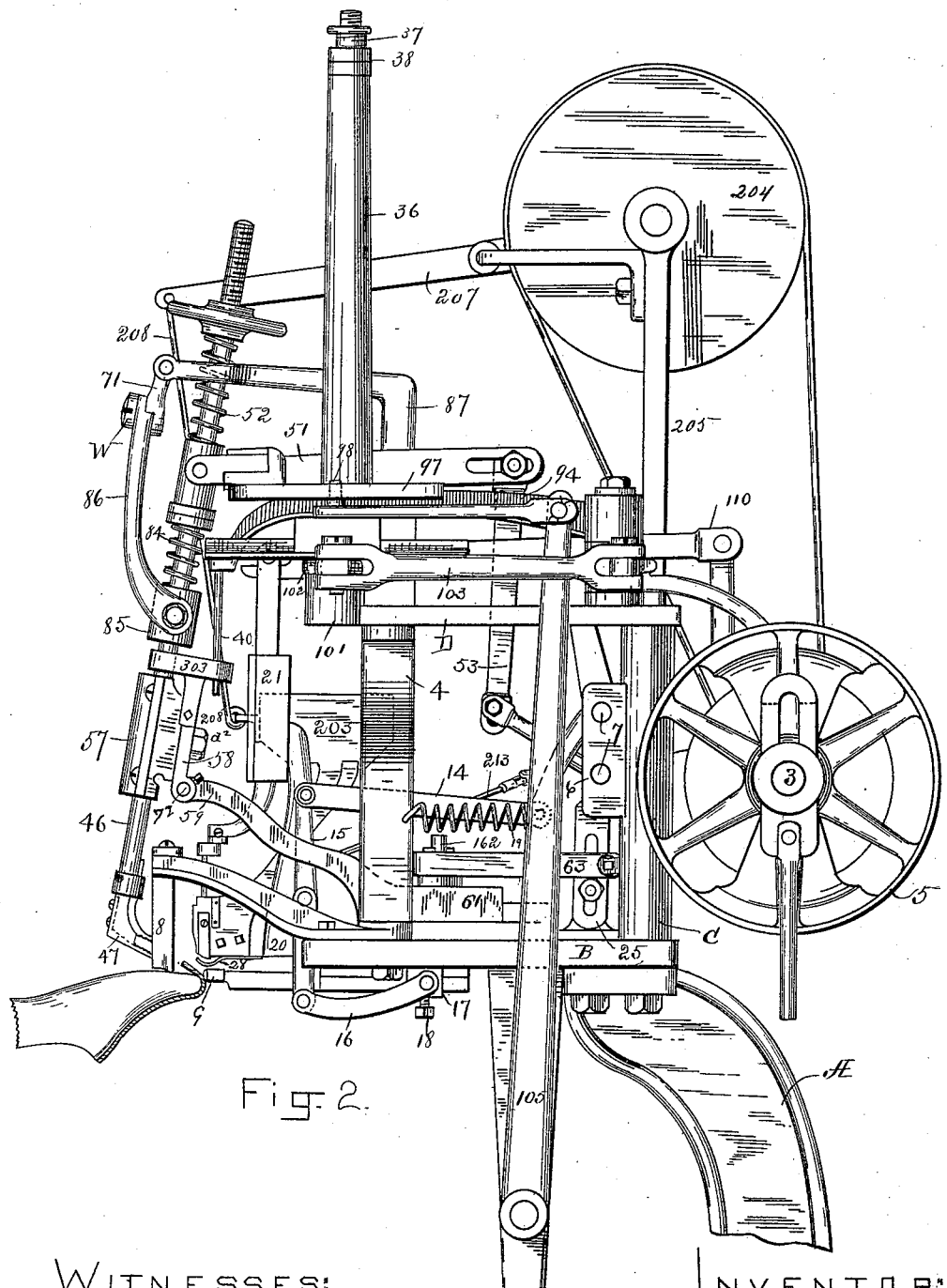
Figure 8:
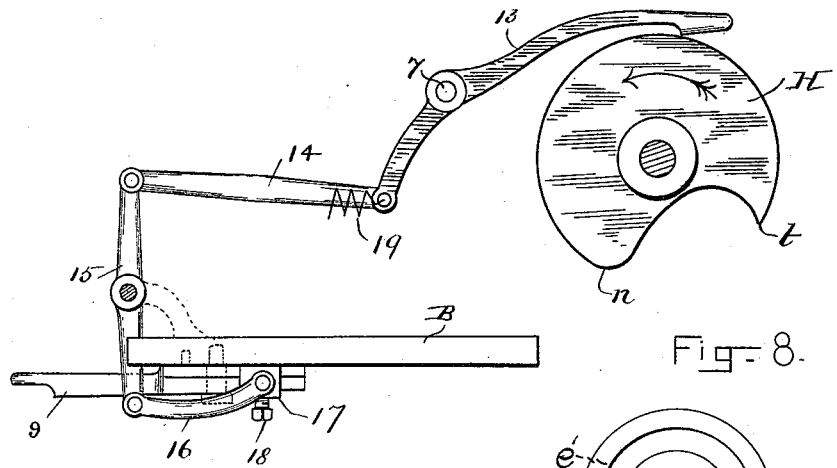
Figure 12:
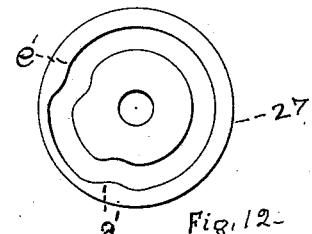
Figure 7:
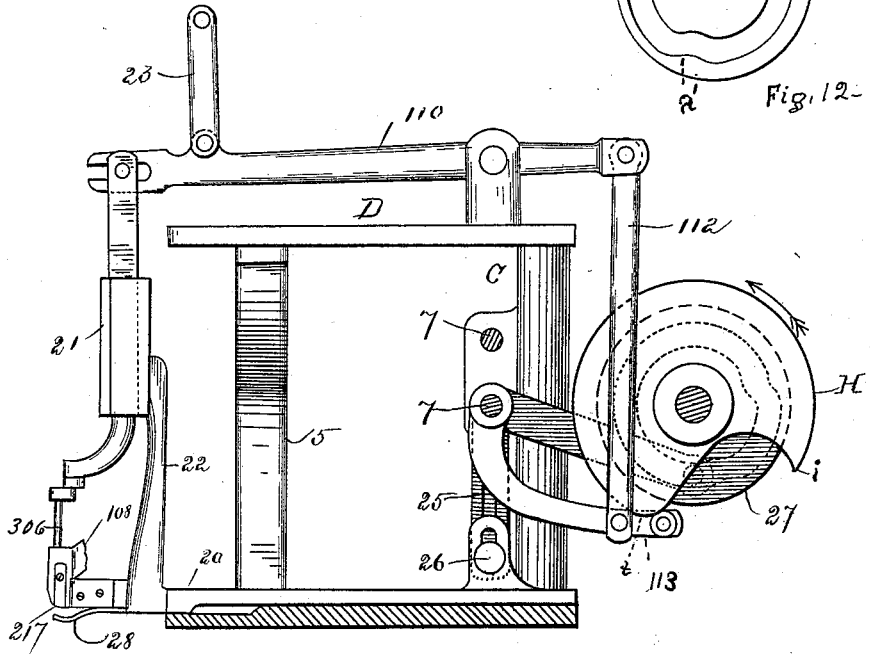
Figure 14:
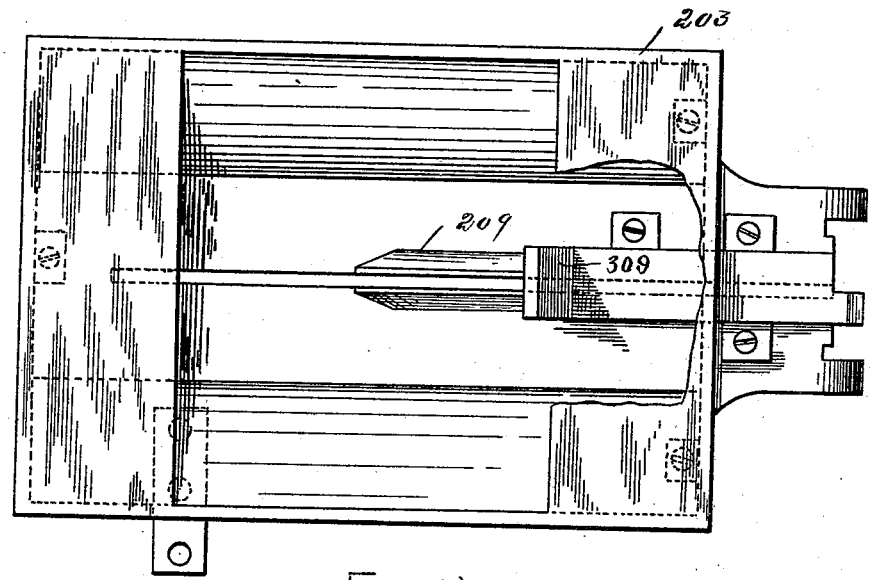
Figure 15:
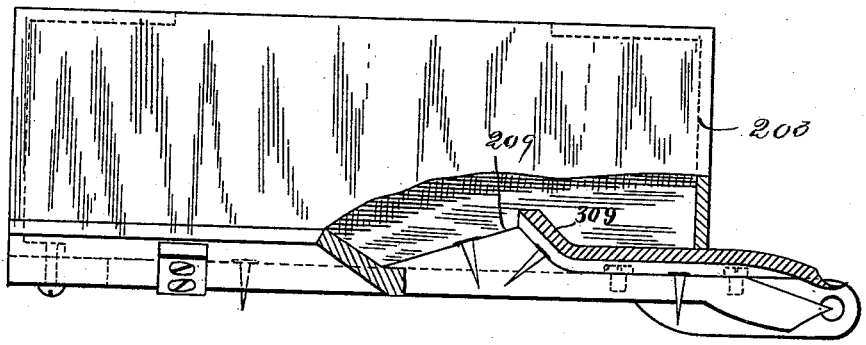

Referring to the drawings, Figure 1 is a side elevation of right side upper part of the machine. Fig. 2 is the reverse of Fig. 1. Fig. 3 is a front elevation of the upper part of the machine. Fig. 4 is a perspective view showing the bottom part of the machine, also the mechanism for giving the plaiting operation to the pincher mechanism. Fig. 5 is a detail. Fig. 6 is a side elevation of the pincher's driving mechanism detached from the other parts of the machine. Fig. 7 is a similar view of the tack or nail driving mechanism and its connections. Fig. 8 is a detail. Fig. 9 is a vertical longitudinal section of the pinchers. Figs. 10, 11, and 12 are cams to be referred to and described hereinafter. Fig. 13 is a detail. Fig. 14 is a plan view of the tack-distributer. Fig. 15 is a vertical longitudinal section thereof. Fig. 16 is a plan view of the channel for carrying tacks to the driver and its connections. Fig. 17 is a side view of Fig. 16 with one side of the channel removed. Figs. 18 and 19 are details. Fig. 20 is a detail plan. Fig. 20ª is a vertical sectional view. Fig. 21 is a perspective view, and Figs. 22 to 28 are diagrams illustrating the progressive operations in the lasting of a shoe.

Before proceeding to describe the constructions in detail of the various parts of my improved lasting-machine I will first refer to the main operating parts which act more directly on the lasted upper and the operations of these parts, and will thereafter describe their particular construction and the devices which are illustrated in the drawings for effecting their operations, which construction and devices may of course be considerably varied without departing from the main features of my invention.

The material to be operated upon is arranged upon a last, as usual—that is, there is a sole P, Fig. 21, tacked to the last Q, and an upper R placed upon the last, with its edge r extending above the same in position to be turned down and tacked to the last, as in the ordinary operation of lasting.

Hereinafter in referring to the presentation of the last to the operating devices I shall for convenience include in the term "last" the last with the material supported thereby.

For seizing the edge of the upper and drawing it down upon the last in proper position to receive the tack I employ a pair of jaws or grippers or tongues S, which I designate by the term "pinchers," and which can be opened to receive the edge r of the upper and then closed upon the same to grip it properly to draw it back.

Heretofore it has been common in lasting shoes to support and feed the last by means of an automatically-operating jack; but this has proved in most cases to be ineffectual because of the differences in the qualities of leather and because of slight variations in the arrangement of the uppers upon the last, so that the operations which would serve to properly stretch one upper and secure it to the sole would not be available in securing the proper result with another upper. For these reasons I support and feed the last by the hands of the operator, who can thereby manipulate the last so as to vary the operations as required by the varying character of the work. As it would not be practicable for the operator to so support the last in his hands as to properly resist the upper and lateral drawing action of the pinchers and so as to gage it in relation to the pinchers, I employ a fixed rest 8 in such a position as to afford a bearing for the bottom of the last, and which is preferably provided with a pointed or sharpened edge which will penetrate the sole upon the last, upon which bearing the last may be turned and adjusted with the greatest facility, but upon which it may be pressed, so as to prevent any slipping of the last under the draft of the pinchers.

In order to gage the last and adjust it with facility in its exact position to present the edge of the upper to the pinchers that it may be with certainty seized thereby, I employ a gage 9, which remains stationary in proper position to define the position of the last prior to the advance of the pinchers, and I prefer to combine with this gage 9 means whereby it may be withdrawn after the upper has been seized.

In connection with the above-described device I also employ a "wiper" 28, which may be a plate or blade, preferably having some elasticity, which advances over the edge of the last and wipes down and presses back the edge of the upper onto the face of the sole as the pinchers draw back, and which wiper, after the pinchers let go their hold upon the edge of the upper, retains the latter firmly down upon the sole and holds it in position to receive the nail, which is then driven into it to secure it to the sole, after which the wiper returns to its first position prior to the succeeding action of the pinchers upon another portion of the upper.

The general arrangement of the parts above described is illustrated in perspective in Fig. 21, and the successive operations in drawing and securing the upper are illustrated in the diagrams Figs. 22, 23, 24, 25, 26, 27, and 28.

Diagram Fig. 22 shows the last as it is applied to the bearing or rest 8 and against the gage 9 and the pinchers S in the position they occupy after they have advanced and seized the edge of the upper. The pinchers then rise and stretch the upper, as illustrated in diagram Fig. 23, the gage moving back, so as to be out of the way. The pinchers then move forward toward the operator, drawing the upper tightly and nearly to a flat position against the sole, the rest preventing the slipping of the last until the parts are in the position shown in Fig. 24, and as the pinchers reach their forward position the wiper 28, which is shown as in the form of a spring attached to a reciprocating bar, is passed forward in firm contact with the upper and presses it down firmly upon the face of the sole and holds it in position to be secured by a nail, which is driven downward by a driver 306, carried with the bar 20 and wiper. The wiper-bar and driver then move back out of the way, the operator adjusts the last so as to bring another portion of the upper into position to be operated upon, and the above-described operations are repeated. It will be seen that the rest 8 is fixed, as is also the gage 9, during the adjustment of the last in a position, and that the pinchers have a back-and-forth movement, which I will hereinafter designate as the "forward reciprocating movement" of the pinchers, and that they also have a vertical movement for the stretching of the upper and for bringing it down upon the sole.

The forward reciprocating movement of the pinchers is effected by means of a carrier, as I will hereinafter set forth, and in addition to these movements described I also use another carrier which imparts to the pinchers lateral reciprocating movements upon opposite sides of the line of the forward movement for the purpose of folding over or plaiting the edge of the upper, as is requisite in folding it down upon the face of the sole in turning the toe and heel. The movements thus imparted to the pinchers are illustrated in the diagrams Figs. 27 and 28.

In Fig. 27 the upper is represented as having been turned down at the right-hand corner of the last, forming the folds $t\ t$, the last bearing upon the rest 8, and the pinchers S are in the position shown in full lines 1. The first movement of the pinchers is backward in the direction of the arrow to the position shown in dotted lines 2, where they seize upon the edge of the upper, and they then ascend and swing forward to the position shown in dotted lines 3, thereby stretching the upper vertically and drawing it forward, after which the pinchers swing to the right to the position shown in dotted lines 4 and descend close to the sole, thereby folding or plaiting the portion of the leather over toward the right, after which the wiper 28 moves forward and presses down the fold close against the sole in position to receive the nail, which is then driven through the fold to secure it. The operator then adjusts the last by turning it upon its bearing 8, and the operations are repeated upon another portion of the upper.

In Fig. 28 the upper is shown as having been plaited over to the left portion of the last. In this case the remaining portion at the toe is folded over by a like series of operations, as before described, on reference to diagram Fig. 27, excepting that after the pinchers move forward and seize the upper and stretch it and draw it back they move to the left to the position shown at 4, thereby making the fold or plait to the left prior to the driving of the nail. It will be seen that these operations are required only upon a portion of the last—that is, where there are corners to be turned—and it is therefore requisite to provide means whereby the operator may at will impart to the pinchers the lateral movements in either direction and arrest such movements. For this purpose I employ any suitable appliances between the driving-shaft and the pinchers in connection with a shifter or device against which the operator may bear by hand or otherwise, so as to at will throw the lateral carrier into and out of operation upon the pinchers, the particular appliances which I have found desirable for this purpose being hereinafter fully set forth, and illustrated in the drawings, the mechanism of which I will now proceed to describe in detail.

All the working mechanism is mounted upon a column A, which stands upon the floor. This column is bent forward and upon its upper end supports a plate B, having in the rear part fixed posts C C, to which is fixed an upper plate D. On the rear of these parts are brackets 2, in which is journaled the main driving-shaft 3. On the end of said driving-shaft is the main drive-wheel 5, and connected with this drive-wheel is an ordinary clutch mechanism having a treadle (not shown) extending down to the floor and adapted to be manipulated by the workman to start and stop the machine. On the shaft 3 are set the cams and cam-wheels which give proper motion to the mechanisms, all as hereinafter more fully described. The upper plate D is further supported upon the lower by means of a pedestal-bracket 4. On the front sides of the posts C are projections 6 6, in which are supported rods 7 7, on which the various bell-crank levers turn.

In order that the upper may be presented properly in position while the pinchers are drawing and stretching the same, the rest 8, which is secured by suitable connections to the plate B or other support, is arranged to afford a bearing below the travel of the pinchers, Figs. 1, 2, and 3. The last is pressed firmly upward against this rest, the bottom of the last bearing against the bottom face of the rest, and is thus prevented from being moved about by the strain on the upper. The position of the rest is such that the last, when held up against the same, as stated, will be in position for the pinchers to come forward and clamp the edge of the upper, as referred to hereinafter.

In proceeding to further describe the machine I shall commence with the gripping devices, by means of which the edge of the upper is seized, drawn over the edge of the last, and held down upon the bottom in position to receive the tacks, and which also, at the heel and toe perform the proper plaiting. The pinchers are provided with two jaws, one fixed and the other movable in relation to the fixed jaw. The shank or rod of the pinchers is shown in position in Figs. 1, 2, 3, and 4 at 46, and Fig. 9 is a vertical longitudinal section thereof. Reference may also be had, if desired, to Figs. 11 and 12 of the above-mentioned Letters Patent No. 274,207, where a construction of the pinchers has been fully shown and previously described, said pinchers having laterally-projecting jaws movable one to and from the other. The shank 46 carries the outer or fixed jaw 47. The shank 46 is grooved longitudinally, (see Fig. 9,) and in this groove lies the shank 48 of the movable jaw 49. The shank 48 is held to the shank 46 by means of a collar 50, which collar is fixed to the shank 46, but allows the necessary vertical movement of the shank 48. The vertical movements of the pinchers are imparted by means of a lifter K, which may be constructed in different ways to effect this result. As shown, the lifter is a lever 51, and the main shank 46 of the pinchers is rounded and threaded upon its upper end, as shown in Figs. 1, 2, 3, and 6, and is supported upon the lever 51, which is pivoted upon a standard 88 (see Fig. 6) on the upper plate D. The front end of this lever is forked, the forked portion being arranged to turn on the main portion as a sleeve, and within this fork is located a ring or collar 300, mounted upon trunnions. Through this ring passes the threaded end of the shank 46 aforesaid. The upper end is surrounded by a coil-spring 52, the lower end of which bears upon the ring and the upper end against a thumb-screw, by means of which the tension is regulated. Thus the whole pincher-shank and pinchers are supported upon the collar through the spring 52, and this gives a yielding or spring tension to the pinchers when they have seized the edge of the leather and are drawn up by action of the lever 51. The rear end of the lever 51 is connected by means of a rod 53 to a lever 54, which is pivoted upon the lower rod 7. Its rear end extends back by the side of the cam-wheel E, and a pin in said lever enters the groove in the side of said cam-wheel. The groove in this wheel has a shape as represented in Fig. 11. In order to understand the vertical movement of the pinchers imparted thereto by this cam-wheel, it may here be stated that during this vertical movement, by means of mechanism hereinafter described, the pinchers receive also a movement from and toward the front in order to draw the leather over the last after they have gripped it. We will suppose the pinchers to have gripped the leather. This occurs when the highest part of the cam (marked $a$, Fig. 11) bears upon the pin of the lever 54, and consequently the pinchers are at their lowest point of depression. At that time they are moved by the other mechanism hereinafter described farthest to the rear. Then from the point $a$ to the point $b$ the pin is made to rise quickly, and thereby the pinchers rise quickly by the same motion, drawing up the leather vertically in order to stretch it upward. From the point $b$ to the point $d$, as the wheel advances, the pin and rear end of the lever are depressed, and with them the pinchers come down upon the last, having by other mechanism been moved forward over the last; but they do not at first come down as low as they were carried by the point $a$, since the point $d$ is a less distance from the center of the wheel or shaft, but from the point $d$ round again to the point $a$, as the wheel advances, the pin of the lever is held downward, and consequently the pinchers are also held down; but it will be apparent from the shape of the groove that the pinchers will be gradually lowered more and more as the pin approaches the point $a$. During the first part of its movement the pinchers have hold of the leather, and during the latter part of the movement from $d$ to $a$ the jaws of the pinchers have opened and the pinchers have been moved to the rear while being thus lowered in order to bring them again to the leather to take a new grip. Then at the point *a* the pinchers again seize the leather and rise as before. The spring-tension of the pinchers is caused in the lifting part of the movement of the pinchers by the spring 52. As the lever rises, this spring becomes compressed and the tension increases.

In order to guard against any excessive strain and consequent tearing of the leather, I provide a second tension, which may come into play when the spring 52 has reached a certain point of compression. This consists in making the post 88, on which the lever 51 is pivoted, rest upon a spring 56, which is supported in the upper part of the bracket 4, heretofore referred to. The post passes through the upper plate and through the pedestal-bracket, and is provided with a collar, threaded upon the post, for adjustment, the spring resting upon the pedestal-bracket. The spring is set at the proper tension—say at a certain number of pounds—depending upon the position of the fulcrum of the lever 51 and the limit of tension required. When the strain upon the spring 52 reaches that limit, the spring 56 will yield and thus limit the movement of or strain on the leather.

I have in the description of the parts last given referred to a forward movement of the pinchers, which takes place during the vertical movement, and thus secures a resultant force, causing the pinchers to draw up the leather and carry it over and lay it down upon the last. This forward and the return movements of the pinchers are effected by a carrier J, which may be constructed and operated in different ways. As shown, it is connected with a guide-block 57. The shank of the pinchers below its pivot in the arm 51 passes through the guide-block 57, which block 57 is pivoted to an armed plate 58, and this plate 58 is supported upon the prongs 59, Figs. 1, 2, and 6, but omitted from Fig. 3, which form part of the carrier J, and which embrace the plate on each side and support it by means of small trunnions 72, the trunnions being fixed to the lower corners of the plate. The prongs 59 are carried upon the front end of a block 61, sliding on guides on the upper surface of the lower plate B. A slotted bar 63, Figs. 6 and 20, is connected to a bell-crank lever 69, which gives positive movement to the bar and a forward movement to the block 61 through an intermediate tension-spring. From the block 61 projects upward a pin 162. The slot of the bar 63 receives said pin and above a sliding bearing 301, between which and the end of the bar the pin extends. In rear of the pin 162 is a collar 64 on a spindle 66, Fig. 20. This spindle passes back through the rear cross-piece of the bar 63, and between said cross-piece and the collar on said spindle is a coiled spring 67, encircling the spindle and tending constantly to press the block 301 forward, so that when a forward pressure is applied by means of the bell-crank lever upon the bar it applies a yielding pressure through the spring 67 upon the pin 162, and thereby carries forward the carrier J with a yielding pressure, and with it the guide 57 and the pinchers. This, it will be understood, is the force applied to the pinchers to draw the upper to the front over the last. The collar 64 on the spindle 66 in front of the spring is a threaded nut, and by turning it the tension of the spring 67 may be adjusted in order to put a proper amount of strain upon the upper. The pin of the lever 69 works in a groove in the face of the cam S. The shape of this groove is shown in Fig. 10. The rear arm of the bell-crank lever 69 is over the shaft, as shown in the drawings. When the rear end of the lever 69 is up, the pinchers, through the described intermediate connections, are drawn back to take a fresh hold upon the leather, and as the rear arm of said lever 69 comes down the pinchers are carried forward. That part of the cam-groove in wheel S between *e* and *f* holds the pin in one direction or position, during which time the pinchers are in their rear position, and the mechanisms operate to cause them to grasp the edge of the leather. From the points *f* to *h* on the cam S the pin of lever 69 is depressed, and the pinchers, having by that time seized the leather, are carried forward to draw the leather over the last. From *h* to *k* the pin passes round the curve, remaining in position. During this time the pin has no vertical movement and the pinchers remain in their advanced position over the last, holding the leather in place. From *k* to *e* the pinchers are drawn back to take a new hold upon the leather.

In order that the shoe may be held in position for the pinchers to take hold of the upper, I provide, as above stated, a gage or guide-foot 9. This guide-foot 9 is a bar arranged to slide in suitable ways on the under side of the plate B. It is connected by a series of levers to a cam-wheel H. Fig. 8 of the drawings is a side elevation of these parts—*i. e.*, the cam-wheel H, the bottom plate B, the gage 9, and the mechanism through which motion is transmitted from the cam H to the gage—said parts being detached from the machine. The cam H, it will be understood, is fixed upon the main shaft 3. The lever 13 is pivoted on the top rod 7 and bears one end on the periphery of the cam-wheel H. Its opposite end connects by a rod 14 to the lever 15, which is pivoted on a suitable bracket extending from the plate B upward. The bottom end of this lever 15 connects by a link 16, as shown, with a block 17. The block 17 is on the rear end of the gage 9 and is adjustable thereon by means of a set-screw 18. The rear end of lever 13 bears upon the periphery of the cam H, being held thereon by a coiled spring 19. Said spring is secured at one end to the lever, as shown, and one end to the pedestal-bracket 4. When the end of lever 13 reaches the point *n* on the cam-wheel H, it is lifted, and thereby moves forward the gage 9, and during the movement of the lever from the point $n$ to the point $t$ on the cam the end of the lever remains lifted, and consequently the gage 9 is held forward. During the time the guide or bearing 9 is stationary and the shoe is pressed, as before described, against the extreme end of said bearing the pinchers advance and take hold of the edge of the upper. At the point $t$ on the cam H the rear end of the lever is depressed. The gage is thereby drawn backward and is held backward while the lever passes from the point $t$ to the point $n$ on the cam. During this time the pinchers move upward and forward, as before described, to stretch and pull the upper over the last, the foot being now withdrawn from contact with the upper. At the point $n$ the end of the lever is again lifted and the movements of the guide-foot repeated.

I shall now proceed to describe the mechanism for opening and closing the jaws of the pinchers for gripping and releasing the edge of the leather.

It will be borne in mind from the description heretofore given of the general movement of the pinchers that they pass backward from the last, gradually descending during such backward movement. This brings the pinchers back against the edge of the upper, and it is necessary at that point that the movable jaw should be raised, so that the gripping-face of the fixed jaw should pass beneath the inturned portion of the leather. It will be observed that the jaws are opened back to the rear, as shown in Fig. 9, so that when the movable jaw is raised it opens the space between the two jaws. In practice it is necessary that the upper jaw should be raised about three-fourths of an inch, and this occurs just before the jaw comes back against the upper. The position of these jaws is shown clearly in Fig. 9. The edge of the upper extends upward and forward to enter the pinchers as they descend open. The fixed jaw of the pinchers is provided with side guards or fenders 70, which prevent the upper from entering too far into the pinchers. The fixed jaw is secured to the shank 46 by screws, and is therefore detachable from the shank. The movable jaw is raised by means of a cam on the main shaft through intermediate links and levers and is forced down by a spring 84. The upper end of the shank 48 is connected to a collar 85, which surrounds the shank 46 and slides freely thereon. A forked rod 86 is connected by an intermediate link 71 to a bell-crank lever 87. The link 71 is pivoted one end to the forked rod 86 and one end to the lever 87, as shown. This is done to permit a side movement of the pinchers, referred to hereinafter. The lower or forked end of the rod 86 embraces the collar 85, to which it is pivoted, as shown in Fig. 6. The bell-crank lever 87 is pivoted upon the standard 88 and is preferably forked at its upper end to pass the main shaft of the pinchers. The vertical arm of the bell-crank lever is connected by a pusher-bar 89 to the bell-crank lever 90, which bears on the cam T. (See Fig. 6.) The shape and position of this cam are such as to throw up the rear end of the bell-crank lever and advance the pusher to lift the movable jaw immediately after the nailer advances and just before the advance movement of the nailer is completed. It begins to open at the rise of the cam T at the point $m$ on the cam. The first movement is sufficient to cause the jaws to release the leather, and this occurs just before the nailer, and consequently the presser-foot, hereinafter described, reaches its extreme forward movement. The increased rise of the cam from $m$ to $v$ continues to lift the jaw until at the point $v$ it is at its greatest height. The lifting of this jaw takes place during the backward movement of the pinchers, and immediately after the fixed jaw reaches the edge of the leather the rear end of the bell-crank lever 90 drops from the point of the cam T, and the movable jaw is forced down by the spring 84 to grip the upper and remains constantly in contact with the leather until lifted by the movement of the cam and intermediate mechanism.

Only the movements of the pincher mechanism heretofore described are necessary in operating on the upper at the sides of the last. In order to form plaiting at the heel and toe and occasionally at other points, the lateral movement before referred to is required, and it is also necessary that in such movement the pinchers should be adapted to yield to prevent tearing the upper. In order to permit of lateral movement, I make the forked end of lever 51 in the form of a sleeve to turn on the end of the lever. I also join the arm 86 to its support, forming the joint at W, as before described; also, the trunnions 72 are extended, as shown in Fig. 3, and are allowed to slide loosely in the bearings of the prongs 59, (see Fig. 2,) whereby they are supported, and the plate 58 is also pivoted to the plate 57 by a pivot-pin $a^2$. The lateral movement is effected by means of the laterally-reciprocating carrier 40, which, as shown, is a bar or pin, but may be constructed in different ways and so connected with the pinchers as to carry them with it. As shown, the carrier-bar 40 is employed in connection with a horizontal rod 73, which is arranged in rear of the pincher-shanks, as shown, and which is reciprocated longitudinally by the movements of said carrier-rod 40. On the rod 73 are two coiled springs 74 74, bearing their inner or contiguous ends against a pin or collar 304, Figs. 3 and 4, fixed in or on the rod. The outer ends of these springs bear, respectively, against the collars 75 76, provided with downward extensions 77 and horizontal extensions 78. The horizontal extensions 78 are fitted to a groove in the plate or block 57, which supports the extensions and collars, and consequently the rod 73. The collars are loose on the rod 73, and screws 79, passing from the extensions 77 into the block 57, serve as means whereby to adjust the collars toward and from each other on the rod, and thus to regulate the tension of the springs 74. The opposing powers of the springs 74 operate to keep the block 57 and pincher-shanks supported thereby midway between the collars 75 76, so that a movement of the rod 73 to the left, for example, applies a yielding force to carry the pinchers in that direction. A reverse movement of the rod to the right will in like manner carry the pinchers in that direction. This force is applied through the rods 40 and 73 and through the springs 74 and the collars 75 76. The power which carries the pinchers to either side is limited by the tension of the springs 74, and this, it will be understood, is the force applied to stretch the upper in this direction, whether for purposes of plaiting or otherwise.

It will be understood that the pinchers always return to the center point or line to grasp the upper, and the movement in plaiting is from that point outward in an oblique line. The springs 74 will yield sufficiently to accommodate this movement. This yielding lateral movement of the pinchers is not absolutely necessary for lasting, nor is it required at all times; but it is very advantageous, and especially for operating about the toe and shank. It is desirable, therefore, to leave the mechanism whereby the lateral movements are effected subject to the control of the operator, in order that he may put it into operation at the time desired. To this end I have provided mechanism as follows, (shown in Fig. 4:) The arm 94 carries the pin 40, which enters a slot in the head 303 of the rod 73, and by varying the position and extent of vibration of the arm 94 or of the carrier the requisite changes in the lateral movements of the pinchers may be effected. To vary these movements I employ a driver M, constituting part of the connections between the main driving-shaft and the lateral carrier and connected with the shifter. This driver is shown as a sliding block 99, mounted on a vibrating bar 100. An arm 96 is fixed to the arm 94 and extends laterally therefrom. It is provided with a slotted head 97, and in this slot in this head projects a pin 98, fixed in the block 99, which slides on the bar 100, which bar 100 is pivoted upon an arm 101 on the plate D. The outer side of the arm 101 is provided with an arm 102, which is connected by means of a bar 103 to the bell-crank lever 104. This lever and its operating-cam are fully shown in Fig. 5. This bell-crank lever 104 has a pin which enters a cam-groove in the periphery of the wheel X on the main shaft. It will be apparent that when the lever is rocked it will impart longitudinal movement to the bar 103 and vibrate the bar 100 either to the right or left, and the block acts upon the slotted head 97 of the arm 96 through the pin 98. It will be plain that lateral action both in direction and amount upon the arm 94 will depend upon the position of the pin 98. If the pin be in the center of the slot in the end of the arm 96, it will have no effect upon the arm 94, but the bar 100 will simply turn. If, however, the pin 98 be drawn into the front end of the slot and the connecting-rod 103 be pushed to the front, the pin 98 will act upon the head 97 as upon a lever and will push the rod 73 in one direction and carry the pinchers to the right; but if the pin 98 is in the other end of the slot a like movement of the connecting-rod 103 will draw the rod 73 in the opposite direction and carry the pinchers to the left. The object of this twofold graduated motion is to draw and plait the upper at one time in one direction and at another time in some other direction and to vary the extent of the draft.

It is desirable, as before stated, that this mechanism should be subjected to the control of the workman, so as to be thrown into or out of operation at any moment. To this end I use a shifter N in connection with mechanism as follows, (also shown in Fig. 4:) A lever 105 is pivoted upon a bracket upon the machine. This lever is connected at its lower end by a connecting-rod 107 to a shifter in the form of a bell-crank lever 108. The lever 108 is pivoted on a bracket 109 upon the machine and is forked at one end to receive the knee of the operator. On the bracket 109 is a cross-bar 110, provided with leaf-springs 111. Said springs reach over and bear upon the lever 108 to hold it in place. The upper end of lever 105 is connected by a rod 106 to the block 99, which carries the pin 98. It will be apparent that when the lever 108 stands in the center of cross-bar 110, as in Fig. 4, the pin 98 is at the center of the slot in the head of arm 96. The pinchers will then consequently have no lateral movement. When the lever 108 is pushed to either side, it will draw the pin 98 into one end of the slot and the pinchers will commence to move in a side line, as before described. The lever 108 is intended and arranged to be moved by the knee of the operator. The shifter is retained in position when set by the force of the springs 111. I am aware that this lever could be arranged to be operated by the foot or other part of the body, though I believe the arrangement shown herein to be the most convenient.

I now proceed to describe the tacking and nailing mechanism. The tacks are brought to the driving-point by polished steel guides, Figs. 16 to 19, forming a channel 202, leading from the tack-distributer, hereinafter explained, to a point just below the driver. The forward ends of the guides are supported upon the forward end of a sliding bar 20, Fig. 1. This bar is arranged to slide in a suitable channel in the block 62, Fig. 7. The extreme end of the guide-channel turns down vertically and in line with the driver 306. The driver slides in a guide-block 21, Fig. 7, which is supported by a vertical post 22, fixed upon the bar 20. The upper end of the driver (see Fig. 7) is connected to a lever 110, the forked end of the lever receiving the pin at the upper end of the driver. The lever 110 is supported in a post on the plate D and is connected by a link 23 to the bottom end of a rod 34, Fig. 1. The link 23 is pivoted both to the driver and to the rod 34. The bottom end of the rod 34 is enlarged to slide freely in the inner bore of a hollow post 35, fixed upon the plate D. The rod 34 is surrounded by a coiled spring 36, which bears one end against the head on the rod and the other against a collar 37 on the top end of the rod. The collar 37 is a threaded nut arranged to turn on the rod, and thus the tension of the spring may be regulated. This spring, it will be understood, is the force that drives the hammer down to insert the tack. On the collar 37 is a check-nut 38, whereby the collar may be fastened when once adjusted. Under the bottom end of the rod 34 is a spring 307 to prevent the hammer from descending too far and reduce impact. This spring sets upon the plate D within the hollow post. Instead of the spring some fibrous material, as leather or rubber, may be used. The rear end of lever 110 is connected by a connecting-rod 112 to a lever pivoted upon the lower rod 7, which has a transverse pin under the cam H, Fig. 7. This cam is constructed, as shown, to depress the end of rod 113 and thereby to elevate the driver through the described intermediate connections and hold the driver lifted until the rod reaches the point $i$ on cam H. At this point the rod is suddenly released, thereby allowing the hammer to descend, and it is forced instantly downward by the spring 36, delivering a blow upon the head of the tack. The rear end of the bar 20 is turned slightly upward and is connected by means of a pin 26, Fig. 7, to one end of the bell-crank lever 25. The other end of the bell-crank lever carries a transverse pin that enters a cam-groove in the face of wheels 27, Fig. 7. The shape of this cam-groove is shown in Fig. 12. When the rear end of the lever 25 is raised, the bar 20 and consequently the tack-driving mechanism are pushed forward, and when the lever is depressed this mechanism is drawn back. That part of the cam-groove from $a'$ to $e'$ holds the lever down, during which time the bar 20 is held back and the pinchers come forward and grasp and draw the upper over the last. At the point $e'$ the end of lever 25 is depressed. The bar 20 is thereby pushed forward, carrying the tacker into position for driving the tack. That part of the cam-groove from $e'$ to $a$ holds the lever depressed. During this time the tack is driven. At the point $e'$ the end of the lever is raised to withdraw the bar 20 and given opportunity for the operation of the pinchers to be repeated. A wiper 28, preferably in the form of a spring, is secured at one end to the forward under side of bar 20, and the outer end of this wiper extends forward under the bar in a curved line, as shown in Fig. 7. This wiper extends under the tack-hammer, and when the bar 20 is pushed forward, as before described, the wiper bears upon the upper to fold it over the edge of the last and hold it in place while the tack is driven. I attach great importance to this wiper, and it may be operated in different ways and independently of the tack-guide. It advances forward in line with the draw of the pinchers and acts very much like the thumb of the hand when drawn over the edge of the strained upper to smooth the leather and holds it down closely to the last while the tack is inserted. The wiper, as shown, is attached directly to the bar. It will be evident, however, that it could be operated by an independent mechanism, if desired. The mechanism is so preferably timed that the bar 20 commences to go forward while the pinchers have hold of the upper over the last, and when the wiper 28 comes over the last sufficiently to get a good bearing upon the edge of the upper the pinchers let go and fly back. The tacker-bar 20 continues forward over the last, the wiper 28 now holding and smoothing the upper as it advances until the extreme forward movement of the bar 20 is reached. The arm 113 is then immediately released, as before described, the driver is forced down by the spring 36, and the tack is thereby inserted, it being allowed to pass down through a hole in the guide and wiper. The two steel bars 200 201, which form the guide-channel, are placed adjacent to each other and are held together by screws or other obvious means. These bars are grooved and separated to form the channel 202, which receives the tacks as they come from the distributer. The distributer is a box 203. One end of the box is pivoted to the guide, as shown in Figs. 1 and 3. The free end of the box is raised and lowered by a mechanism as follows: On the main shaft is a pulley, and on a post 205, fixed upon the plate D, is another pulley 204. A belt connects these two pulleys and transmits power from the main shaft to turn the pulley 204. The pulley 204 carries an eccentric-pin 206, that operates in the slotted end of lever 207, pivoted to the post in the plate D, and is connected by a connecting-rod 208 to the free end of the box 203. It will now be understood that each revolution of the wheel 204 operates to raise and lower the free end of the box. The tacks are placed into the box 203 promiscuously in bulk, and as the box lifts and falls the tacks pass by gravity from the free end of the box to the other, and in the bottom of the box a slot is formed that commences near the free end of the box and opens out at the opposite end into the channel 202. This slot is formed by cutting through the bottom of the box and is sufficiently wide to receive the shanks of the tacks, but will not receive the heads of the tacks into the slot. Near the center of the box is formed a ridge 209. Said ridge is formed by raising the sides of the channel at this point, and it is inclined two ways, as shown. (See Fig. 15.) When the box 203 is depressed, so that the tacks fall to the outer end thereof, some of the tacks fall into the slot and there hang suspended by their heads bearing upon the sides of the channel, so that when the box is lifted again the bulk of the tacks pass to the other end of the box, leaving the channel unobstructed and allowing those tacks which hang in the slot to slide forward up the first incline and over the top of the ridge and perhaps down the second incline. The channel in front of this ridge is covered, and all tacks that pass over the ridge are prevented by the ridge from passing back when the box is lowered again. In this manner the tacks are continuously distributed to the channel in front of the ridge and find exit through this channel out of the box. The tacks are moved along the channel by the inclining of the box and the jar of the machine. The box is pivoted to the channel in such manner as to bring the exit from the box in alignment with the groove 202, so that as the tacks exit from the box they pass into the groove 202 and are moved downward by the constant jar of the tack-driver or by other agitating means. At the lower end of the channel 202 is formed a chamber adapted to receive the screw 210. This chamber is formed by enlarging the channel at this point or by arranging the screw adjacent to the channel. This screw receives the tacks from the channel 202, carries them along, and drops them one by one into the guide-tube 215, as designed for use. To this end the screw is provided with a shank or spindle 211, which is journaled to turn in a bushing 212, which is preferably made to screw into a suitable hole in the channel-bars 200 201. A collar on each side or end of the bushing prevents endwise movement of the screw. The rear end of the screw-shank 211 is connected by a universal-joint connection to one end of a connecting-rod 213, Fig. 1. The other end of the rod 213 is connected by a universal joint to the shaft 214. This shaft 214 is journaled to turn in a bracket on the machine-frame and carries a crown-wheel that engages a similar wheel on the main driving-shaft. The result of this mechanism is to give motion to the screw 210, and the mechanism is so timed as to give one revolution of the screw to each complete operation of the tack-driver. Each revolution of the screw drops one tack into the vertical tube 215, where it hangs suspended by the head on a spring-tripper 216, Fig. 16, which is sufficient to retain the tack, but which yields readily to the descent of the driver. Spring-guides 217 guide the tack in its descent directly to the leather.

It remains to be observed that the channel-groove is preferably made wedge shape to prevent the points of the tacks from crowding past each other. It is also covered to prevent the tacks from being thrown out by the jar of the driver. At the point where the tack enters the screw 210 a spring 218 is arranged with its end adapted to press lightly upon the top until it has fairly entered the threads of the screw. The screw 210 at the point where it commences is the size of the shank or spindle and gradually is enlarged to the full size, thus forming a gimlet-like screw-section. This formation allows the screw to take the tack close up under the head, and to this end also a slight lateral angle 220 is here formed in the channel. (See Fig. 16.) The screw is revolved in the direction of the arrow, Fig. 17, and a tack having once entered the screw is carried along regularly between the screw-threads and the side of the channel-point downward until it arrives at or near the extreme end of the screw. Here the angle of the screw-thread changes abruptly to an angle of about forty-five degrees, so that the tack is moved point forward into the guide-tube 215. This special formation of screw causes the tack to turn into the guide-tube point first. It also allows the extreme end of the screw to be notched out at one side at 221. (See Fig. 18.) This allows the screw to be set forward over the guide-tube in order to carry the tack completely into the guide-tube before dropping the same; but a partial revolution of the screw throws the notched part of the screw in line with the tube, leaving a free passage to drop the tack, and thus allowing the driver to descend without striking the screw. The driver should of course be so timed as to lift out of the tube in time to allow the continuous movement of the screw.

I would also call attention to the curvature of the guide-bars 200 201.

I am aware that some articles, as buttons, may be carried from a distributer operated similar to the one herein described through a straight channel; but in transmitting tacks I have encountered great difficulty to keep the tacks in place and prevent them from crowding in the channel. This difficulty arises largely from the inclination imparted to the guide, and to obviate this I have curved the guides, as shown, and this allows the box to be pivoted out of line with the feeding end of the channel. This construction very much reduces the vibration, and the difficulty before encountered is practically obviated.

I do not here claim the tacking mechanism shown and described, as it will form the subject of a separate application for Letters Patent.

I do not here claim the method of lasting herein set forth, as it constitutes the subject of a separate application for Letters Patent, Serial No. 266,028.

Without limiting myself to the precise construction and arrangement of parts shown, I claim—

1. In a lasting-machine, the combination, with a fixed rest, of a single pair of pinchers suspended above said rest, and mechanism for moving said pinchers vertically and forward and back above and over the rest from a position in front to a position back of the same, substantially as described.

2. In a lasting-machine, the combination, with a fixed rest, of a single pair of pinchers suspended above said rest and adapted to be moved vertically and forward and back above and over the rest from a position in front to a position toward the back of the same, and a forwardly and backwardly moving elastic wiper, substantially as described.

3. A lasting-machine provided with a frame, a rest supported in a fixed position on the frame, a pair of pinchers and appliances supporting them above the rest in position to swing from front to back over the rest, and mechanism connected with the pinchers to open and close and move the same vertically and forward and back, substantially as described.

4. In a lasting-machine, the combination, with a fixed rest having its bearing-surface upon its under side, of a single pair of pinchers suspended above said rest and adapted to be moved vertically, laterally, and forward and back above the horizontal plane of the rest, whereby the upper is drawn over the last and plaited at the same time, substantially as set forth.

5. In a lasting-machine, the combination, with the reciprocating pinchers and fixed rest, of a guide 9, adjustable to and from the rest, for the purpose set forth.

6. In a lasting-machine, the combination, with the reciprocating pinchers, of a rest having an under bearing for the last, and an edge guide 9, movable toward and from the rest, substantially as described.

7. In a lasting-machine, the combination, with the pinchers and last-rest and with the devices for reciprocating the pinchers back and forth, of the devices for reciprocating the pinchers laterally, a shaft from which motion is imparted to said devices through a movable driver, and a shifter whereby said driver may be moved by the operator to vary or arrest the lateral reciprocation, substantially as described.

8. The combination, in a lasting-machine, of pinchers and pincher-actuating mechanism, the driver M, and the shifter N and connections, substantially as described.

9. In a lasting-machine, the combination, with the pinchers of a lasting-machine supported to move freely, of a carrier J and devices for moving it laterally, said carrier connected with said pinchers to swing them sidewise, substantially as described.

10. In a lasting-machine, the combination, with the pinchers, of two carriers 40 J, one moving back and forth and the other from side to side and each connected to operate the pinchers, substantially as described.

11. In a lasting-machine, the combination, with the pinchers, of a laterally-movable carrier, driving-shaft, movable driver, and a shifter arranged in the line of connection between the pinchers and shaft in position to be moved by the operator, substantially as described.

12. In a lasting-machine, the combination, with the pinchers and carrier, of a vibrating block, a bearing movable upon said block past the axis thereof, and a shifter connected with said bearing and arranged to be operated by the attendant, substantially as described.

13. In a lasting-machine, the combination, with the pinchers and the forward and laterally movable carriers therefor, of the driving-shaft and connections between the same and the carriers, and a driver connected with the laterally-reciprocating carrier and adjustable to vary the movements of the carrier, substantially as described.

14. In a lasting-machine, the combination, with the pinchers and devices for moving the same forward and laterally, of a lifter K, provided with a swivel and a sleeve, substantially as described.

15. In a lasting-machine, the combination, with the pinchers S, forward and lateral carriers J and 40, and lifter K, of side spring-bearings interposed between the lateral carrier and the pinchers, substantially as described.

16. In a lasting-machine, the combination of the pinchers S, lateral carrier 40, and intermediate yielding bearings, substantially as described.

17. In a lasting-machine, the combination of the pinchers S, a lifter K, and forward and lateral carriers J and 40, and vertical and lateral yielding bearings between the pinchers and said lifter and carriers, substantially as described.

18. In a lasting-machine, the combination of the vertically-reciprocating lifter provided with a swinging yoke supporting a pivoted ring or collar, in combination with pinchers supported by a shaft extending through said collar, substantially as described.

19. In a lasting-machine, the combination, with the swinging pinchers, of a slide connected with the movable jaw thereof and jointed connections 71 86 between said slide and an operating-shaft, substantially as described.

20. In a lasting-machine, and in combination, pinchers provided with mechanism for causing them to grip the leather and draw it over the last, and a wiper and mechanism, substantially as described, to advance it over the last toward the position of the pinchers, said mechanisms being timed so that the wiper shall commence to advance while the pinchers hold the leather tightly down over the last and continue to advance after the pinchers let go and bear upon and hold the leather tightly stretched during the latter part of the movement, substantially as described.

21. In a lasting-machine, the combination, with the reciprocating pinchers, of a nailer and means, substantially as described, for moving the latter horizontally toward and from the last independently of the movements of the pinchers, substantially as described.

22. In a lasting-machine, in combination, pinchers provided with mechanism for causing them to grip the leather and draw it over the last, a nailing mechanism, substantially as described, adapted to advance into the position of the pinchers for inserting the tack, and a wiper independent of the pinchers for smoothing and holding the strained upper while the tack is inserted, the wiper being timed to take hold in time for the pinchers to let go and give place to the nailer, all substantially as described.

23. In a lasting-machine, the pinchers suspended as described and provided with a sleeve on a lever 51, joint W, loose trunnions 72, and mechanism to impart a forward lateral movement to the pinchers, substantially as described.

24. In a lasting-machine, the combination of the shank 48 and upper jaw, the shank 46, with lower jaw, collar 85, spring 84, rod 86, link 71, bell-crank lever 87, and connections with the driving mechanisms, substantially as described.

25. In a lasting-machine, the combination of the guide-foot 9, sliding on the under side of plate B, the rod 16, lever 15, and connections with the driving mechanism, substantially as described.

26. In a lasting-machine, the combination of the driver, the guide-block 21, lever 110, the link 23, spring 36, rod 35, post on the plate D, and the driving mechanism connected to the lever 110, substantially as described.

27. In a lasting-machine, in combination with the driver suspended as described, the bar 20, the lever 25, and driving mechanism, substantially as described.

28. The combination, with the stretching devices of a lasting-machine, of a box 203, provided with the described slot or channel and double-incline ridgeway 209, with the channel and tack-driver, all substantially as described.

29. In a lasting-machine, the combination, in the pinchers, with the upper movable jaw, of the lower jaw and side flanges secured thereto, whereby the edge of the leather is prevented from entering the pinchers too far, substantially as described.

JAN E. MATZELIGER.

Witnesses:
G. B. DUNHAM,
C. B. TUTTLE.